United States Patent [19]

Yamada et al.

[11] Patent Number: 5,447,973
[45] Date of Patent: Sep. 5, 1995

[54] SOFT SEGMENT-CONTAINING MODIFIED EPOXY RESIN AND CATHODIC ELECTRODEPOSITION PAINTS CONTAINING SAME

[75] Inventors: Mitsuo Yamada, Suita; Toshiyuki Ishii, Sakai, both of Japan

[73] Assignee: Nippon Paint Co., Ltd., Osaka, Japan

[21] Appl. No.: 243,012

[22] Filed: May 16, 1994

[30] Foreign Application Priority Data

May 17, 1993 [JP] Japan ................... 5-139589

[51] Int. Cl.$^6$ .......................... C08K 3/20; C08L 63/02
[52] U.S. Cl. ..................... 523/415; 525/528; 528/110
[58] Field of Search ............ 523/415; 525/528; 528/110

[56] References Cited

U.S. PATENT DOCUMENTS 5,276,072  1/1994  Ishii et al. ................... 523/415

Primary Examiner—Melvyn I. Marquis
Assistant Examiner—D. Aylward
Attorney, Agent, or Firm—Millen, White, Zelano, & Branigan

[57] ABSTRACT

Diglycidyl ether epoxy resins are reacted with a prepolymer produced from an organic diisocyanate and a bifunctional active hydrogen compound having a soft segment whose terminal isocyanate groups have been blocked to chain-extend the epoxy resin with the prepolymer. The chain-extended epoxy resin is then reacted with a cationic active hydrogen compound alone or incombination with an aliphatic monoalcohol, alkylphenol, glycol monoether or bisphenol to open the terminal epoxy rings of the chain extended epoxy resin. The modified epoxy resin thus produced is dispersed in an aqueous medium containing a neutralizing agent together with a crosslinker to give a cathodic electrodeposition paint having improved impact strength and other properties.

20 Claims, No Drawings

SOFT SEGMENT-CONTAINING MODIFIED EPOXY RESIN AND CATHODIC ELECTRODEPOSITION PAINTS CONTAINING SAME

BACKGROUND OF THE INVENTION

This invention relates to a modified epoxy resin. More particulary, it relates to the modified epoxy resin containing a soft segment for use as a binder resin of cathodic electrodeposition paints.

Modified epoxy resins to be incorporated into cathodic electrodeposition paints are conventionally produced by reacting a starting epoxy resin with a cationic active hydrogen compound such as primary or secondary amines to open at least a portion of the epoxy rings with the active hydrogen compound in order to introduce a hydrophilic and electrically chargeable group into the resin. These resins may be thermally cured either by the reaction with an external crosslinker such as melamine resins or blocked polyisocyanates, or by the self-crosslinking reaction of a pendant blocked isocyanato moiety bound to a secondary alcoholic hydroxyl group present in the starting epoxy resin.

Since epoxy resins containing aromatic rings .such as biphenol epoxy resins generally produce a cured film having decreased flexibility, it is known that the flexibility may be improved by reacting the starting epoxy resin with an alkylphenol such as t-butylphenol or nonylphenol, or a long-chain fatty acid so that these components are introduced into the resin molecule by the ring opening reaction of a portion of epoxy rings with these components. Modified resins thus produced, however, have a defect that the curability thereof is decreased and the curing requires relatively high temperatures.

Another known approach for improving the flexibility is the use of an epoxy resin having a soft segment in the resin molecule. For example, bisphenol epoxy resins may be chain extended by the reaction with a bifunctional polyol containing the soft segment such as bifunctional polyether polyols. This approach has a defect that other performance of the cured film and corrosion resistance in particular are not satisfactory.

SUMMARY OF THE INVENTION

It is, therefore, a major object of the present invention to provide a novel modified epoxy resin which eliminates or ameliorates the defects of known modified epoxy resins.

This object may be accomplished by incorporating the soft segment into the resin molecule through a unique chemical linkage. According to the present invention, a method is provided for producing a modified epoxy resin having a soft segment in the middle of resin molecule and a plurality of cationic groups at terminals. This method is distinguished over the prior art method in that it uses as a chain extending agent a prepolymer produced from an organic diisocyanate and a bifunctional active hydrogen compound having the soft segment whose terminal isocyanato groups have been blocked.

The method comprises, therefore, the steps of:
chain-extending a diglycidyl ether epoxy resin with said prepolymer having terminal blocked isocyanato groups; and
ring-opening at a portion of epoxy rings of the chain-extended epoxy resin with a cationic active hydrogen compound to introduce a cationic group to the terminals of the chain-extended resin.

In another aspect, the present invention provides a cathodic electrodeposition paint comprising the modified epoxy resin produced by the above method and a crosslinker dispersed in an aqueous medium containing a neutralizing agent.

DETAILED DESCRIPTION OF THE INVENTION

For better understanding, now the reaction sequence involved in the method of the present invention will be explained using a model.

The first step is the reaction between a diglycidyl ether epoxy resin of the formula I and a blocked urethane prepolymer of the formula II having a soft segment.

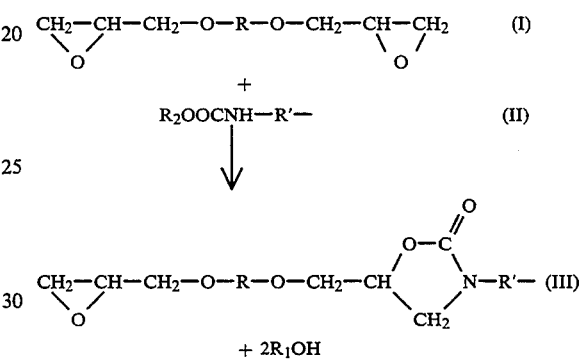

wherein R is the residue of a diglycidyl ether epoxy resin, R' is the residue of a bifunctional urethane prepolymer, and R, is the residue of a monoalcohol used as a blocking agent.

The second step is the reaction between the product of the first step of the formula III and a secondary amine.

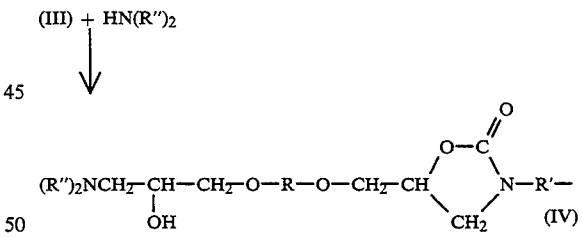

wherein R" is the hydrocarbon residue of a secondary amine.

It is to be appreciated that the formula (II), formula (III) and formula (IV) represent the structures of their respective compounds only partially and the entire structures may be considered to be symmetric relative to the residue R'.

The modified epoxy resin of the present invention is produced from an epoxy resin having a plurality of glycidyl groups. Typical examples thereof include polyphenol polyglycidyl ether type epoxy resins produced by reacting a polycyclic polyphenol such as bisphenol A, bisphenol F, bisphenol S, phenol novolac or cresol novolac with epichlorohydrine. A variety of bisphenol epoxy resins are commercially available including EPIKOTE 827 ( epoxy equivalent 180-190), EPIKOTE 1001 (epoxy equivalent 450-500), EPIKOTE 1010

(epoxy equivalent 3000–4000), all sold by Yuka Shell Epoxy K.K. Also included in usable epoxy resins are polyglycidyl ethers of aliphatic polyols such as ethylene glycol, propylene glycol, 1,4-butanediol, 1,6hexanediol, trimethylolpropane, pentaerythritol, polyalkylene glycol and the like.

For use as a starting resin, bifunctional epoxy resins may be chain extended using the reaction with bifunctional polyphenols, polycarboxylic acids or polyisocyanate or polyamines. Bisphenols such as bisphenol A or bisphenol F and aliphatic or aromatic dicarboxylic acids such as succinic, adipic, phthalic, isophthalic or terephthalic acid may also be used in the chain extending reaction.

Chain extending reactions of bifunctional epoxy resins with an organic diisocyanate are disclosed in Iwakura et al., J. Polymer Sci., Part A-1, 4, 751 (1966) and Sander et al., J. Appl. Polymer Sci., 9, 1984 (1966). Chain extended epoxy resins resulting from these reactions contain a plurality of oxazolidone rings in the resin backbone.

The starting epoxy resins have a molecular weight generaly between 200 and 10,000 and preferably between 400 and 4,000.

Step 1

The blocked urethane prepolymer used in the first step is produced by reacting a bifunctional active hydrogen compound having a soft segment with a blocked diisocyanate. Examples of usable diisocyanates include aromatic diisocyanates such as tolylenediisocyanate (TDI), xylylenediisocyanate (XDI), 4,4′-diphenylmethanediisocyanate (MDI) and the like; and aliphatic and alicyclic diisocyanates such as hexamethylenediisocyanate (HMDI), isophoronediisocyanate (IPDI), 4,4-methylenebis(cyclohexylisocyanate), trimethylhexamethylenediisocyanate and the like.

A variety of blocking agents are well-known in the art. Examples thereof include aliphatic alcohols such as methanol, ethanol, isopropanol, n-butanol, 2-ethylhexanol, ethyleneglycol monobutyl ether, cyclohexanol and the like; phenols such as phenol, nitrophenol, ethylphenol and the like; oximes such as methyl ethyl ketoxime; and lactams such as $\epsilon$-caprolactam. Methanol or ethanol is preferable.

As stated before, the present invention differs from the prior art in that the starting epoxy resin is reacted not directly with the bifunctional soft segment-containing active hydrogen compound but with a blocked prepolymer produced therefrom by the reaction with a blocked diisocyanate. Thus the soft segment is incorporated in the middle of the chain extend epoxy resin molecule through oxazolidone rings formed by the reaction of the epoxy ring and the blocked isocyanato group as reported in Iwakura et al. supra.

The bifunctional active hydrogen compound to be used for this purpose may be the same as the compound used for directly chain extending the epoxy resin in the prior art methods. Specific examples thereof include polyether diols produced by addition-polymerizing an alkylene oxide such as ethylene oxide, propylene oxide, or tetrahydrofuran using a bifunctional initiator such as bisphenol A; polyester diols such as polyalkylene adipate or polycaprolactone diol; polyoxyalkylene diamins such as polyoxypropylene diamine; alkylenediamines containing more than five carbon atoms such as hexamethylenediamine; long chain aliphatic dicarboxylic acids having more than 5 carbon atoms such as dimer acid; carboxyl-terminated nitrile rubber oligomer and hydroxyl-terminated polybutadiene oligomer.

Blocked prepolymers may preferably produced by blocking the organic diisocyanate with methanol or ethanol and then reacting the blocked diisocyanate with the bifunctional active hydrogen compound. It is, of course, possible to carry out the above reaction sequence in reverse order. Thus, the blocked prepolymer may be produced by reacting the bifunctional active compound with the organic diisocyanate and then blocking the resulting free isocyanate prepolymer with methanol or ethanol. In the above reactions, the equivalent ratio of isocyanato group to active hydrogen atom must be equal to or slightly excess of 2.

In the reaction between the starting epoxy resin and the blocked prepolymer, the equivalent ratio of blocked isocyanate group to epoxy ring should be less than 1. In other words, the amounts of both reactants should be such that the product of the first step still retains unreacted epoxy ring. The reaction may be carried out by heating the reactants at a temperature between 60° C. and 200° C. It is preferable to remove a reaction by-product such as methanol or ethanol from the reaction system using a conventional method such as distillation.

Prior to subjecting to the reaction with a cationic active hydrogen compound in the second step, the chain extended epoxy resin may be reacted with aliphatic alcohols such as 2-ethylhexanol, alkylphenols such as nonylphenol, glycol monoethers such as propyleneglycol mono-2-ethylhexyl ether, or bisphenols such as bisphenol A in order to adjust the molecular weight or amine equivalent and/or to improve thermal flowability.

Step 2

In the second step, a cationic active hydrogen compound is used to open the remaining epoxy ring in the product of the first step. Examples of usable cationic active hydrogen compounds include primary or secondary amines such as butylamine, octylamine, diethylamine, dibutylamine, methylbutylamine, monoethanolamine, diethanolamine or N-methylethanolamine, tertiary amine-acid addition salts such as triethylamine hydrochloride or N,N-dimethylethanolamine acetate, and sulfide-acid mixtures such as diethylsulfideacetic acid mixture. Ketimines of a primary amine such as aminoethylethanolamine or diethylenetriamine may also be used. Any combination of these amines and ketimines may also be used. Care should be taken when using a primary amine because it also plays the role of a chain extender and renders the resin too viscous. For use as binder resins, it is preferable for the resulting modified resin to have an amine equivalent from 0.3 to 4.0 meq/g. If the amine equivalent is too low, emulsification or dispersion in an aqueous medium becomes difficult. Conversely, if the amine equivalent is too high, it is hardly possible to give a film having a satisfactory water resistance.

Electrodeposition Paints

The modified epoxy resins of the present invention may be cured with the aid of external crosslinkers such as blocked polyisocyanates or melamine resins. When formulated in cathodic electrodeposition paints, their characteristic performance may be exhibited to the fullest extent. As discussed before, conventional modified epoxy resins are not satisfactory in the reactivity with crosslinkers and other properties. The modified epoxy resin of the present invention satisfies with not only the reactivity with crosslinkers and impact strength but also other performance including emulsifiability, thermal flowability, corrosion resistance and heat resistance.

For preparing electrodeposition paints, the modified resins of the present invention is dispersed together with a crosslinker in an aqueous medium containing a neutralizing agent. Typically the crosslinker is an etherified methylolmelamine resin or blocked polyisocyanate. The neutralizing agent is, of course, an acid such as hydrochloric acid, nitric acid, phosphoric acid, formic acid, acetic acid, lactic acid, sulfamic acid or acetylglycine.

The amount of crosslinking agent must be sufficient to give a rigid film through a crosslinking reaction with amino, hydroxyl or carboxyl groups contained in the resin and generally ranges from 5 to 50% by weight of the modified resin on solid basis. The amount of neutralizing agent is such that at least 20%, preferably 30 to 60% neutralization of the modified resin may be achieved.

When a blocked polyisocyanate is the crosslinker, the paint formulation may contain 0.1 to 5% by weight of the blocked polyisocyanate of a catalyst such as dibutyltin dilaurate, dibutyltin oxide or other urethane-cleaving catalysts. The paint formulation may, of course, have a variety of conventional additives depending upon its particular application. Examples thereof include coloring pigments such as titanium dioxide, carbon black or ferric oxide; rustproof pigments such as basic lead silicate or aluminum phosphomolybdate; extender pigments such as kaolin, talc or clay; and other additives such as water-miscible organic solvents, surfactants, antioxidants, UV absorbers and the like. The resulting water-borne paints may be applied on a substrate not only by the electrodeposition process but also by spraying, dipping and other conventional methods.

The following examples are intended to further illustrate the invention without limiting thereto. All part and percents therein are by weight unless otherwise indicated. All epoxy equivalents and amine or base equivalents therein are on dry contents basis.

EXAMPLE 1

A flask equipped with a stirrer, condenser, nitrogen gas tube, thermometer and drip funnel was charged with 130.0 g of 2,4-/2,6-tolylenediisocyanate(80:20 weight ratio), 165.0 g of methyl isobutyl ketone (MIBK) and 0.13 g of dibutyltin dilaurate. To the mixture was added dropwise 42.0 g of methanol over 30 minutes while stirring and nitrogen gas bubbling. The inner temperature rose to 60° C. during this period. After continuing the reaction for additional 30 minutes, 94.0 g of polytetramethylene glycol (PTG-1000, sold by Hodogaya Chemical Co., Ltd.) was added dropwise over 1 hour and allowed to react at 60°-65° C. until the absorption of isocyanato group disappeared in IR spectrometry. Thereafter 669.0 g of bisphenol A epoxy resin having an epoxy equivalent of 188 and 2.0 g of benzyldimethylamine were added to the flask. Then the mixture was allowed to react at 120° C. while distilling off methanol produced as a by-product until an epoxy equivalent of 372 was reached. The IR spectrometry demonstrated the absorption of oxazolidone carbonyl at 1750 cm$^{-1}$. Thereafter, a mixture of 43, 0 g of bisphenol A and 191.8 g of nonylphenol was added to the flask and allowed to react until an epoxy equivalent of 1130 was reached. After cooling, 42.0 g of diethanolamine, 30.0 g of N-methylaminoethanol and 47.1 g of aminoethylethanolamine ketimine (79% solution in MIBK) were added to the reaction mixture and allowed to react at 110° C. for two hours. The product was diluted to 80% nonvolatile with MIBK to obtain Modified resin A having a number average molecular weight of 2300 (GPC method) and an amine equivalent of 97 meq/100 g.

EXAMPLE 2

Analogous to Example 1, 147.0 g of 2,4-/2,6-tolylenediisocyanate (80:20 weight ratio) was reacted with 42.0 g of methanol. Then 93.5 g of bisphenol A-ethylene oxide (6 moles) adduct (BPE-60 sold by Sanyo Chemical Industries, Ltd.) was reacted in place of polytetramethylene glycol to produce a blocked prepolymer. The prepolymer was reacted with 658.0 g of bisphenol A epoxy resin having an epoxy equivalent of 188, and then with a mixture of 37.0 g of bisphenol A and 191.8 g of nonylphenol. The product was further reacted with the same amounts as in Example 1 of diethanolamine, N-methylaminoethanol and aminoethylethanolamine ketimine and diluted to 80% nonvolatile with MIBK to obtain Modified resin B having a number average molecular weight (GPC method) of 2500 and an amine equivalent of 97 meq/100 g.

EXAMPLE 3

A flask equipped with a stirrer, condenser, nitrogen gas tube, thermometer and drip funnel was charged with 132.2 g of 2,4-/2,6-tolylenediisocyanate(80:20 weight ratio), 165.0 g of methyl isobutyl ketone (MIBK) and 0.12 g of dibutyltin dilaurate. To the mixture was added dropwise 29.2 g of methanol over 30 minutes while stirring and nitrogen gas bubbling. The inner temperature rose to 60° C. during this period. After continuing the reaction for additional 30 minutes, 70.0 g of polyoxypropylene diamine (JEFFAMINE D-400 sold by TEXACO Chemical) was added dropwise over 1 hour and allowed to react at 30°-50° C. until the absorption of isocyanato group disappeared in IR spectrometry. Thereafter 730 g of bisphenol F epoxy resin having an epoxy equivalent of 475, 282.0 g of bisphenol F epoxy resin having an epoxy equivalent of 950 and 2.2 g of benzyldimethylamine were added to the flask. Then the mixture was allowed to react at 120° C. while distilling off methanol produced as a by-product until an epoxy equivalent of 1250 was reached. The IR spectrometry demonstrated the absorption of oxazolidone carbonyl at 1750 cm$^{-1}$. After cooling, 24.5 g of diethanolamine, 52.4 g of N-methylaminoethanol and 55.7 g of aminoethylethanolamine ketimine (79% solution in MIBK) were added to the reaction mixture and allowed to react at 110° C. for two hours. The product was diluted to 80% nonvolatile with MIBK to obtain Modified resin C having a number average molecular weight of 2400 (GPC method) and an amine equivalent of 98 meq/100 g.

EXAMPLE 4

Analogous to Example 1, 125.0 g of 4,4'-diphenylmethanediisocyanate was reacted with 20.5 g of methanol. Then, 115 g of dimer acid (VERSADIME 288 sold by Henkel-Hakusui K.K.) was reacted to produce a blocked prepolymer. The prepolymer was reacted with 618 g of bisphenol F epoxy resin having an epoxy equivalent of 475 and 190 g of bisphenol F epoxy resin having an epoxy equivalent 950. The product was further reacted with 37.44 g of diethanolamine, 26.14 g of N- methylaminoethanol and 33.48 g of aminoethylethanolamine ketimine (79% solution in MIBK) and diluted to 80% nonvolatile with MIBK to obtain Modified resin D having a number average molecular weight (GPC method) of 2600 and an amine equivalent of 95 meq/100 g.

EXAMPLE 5

Analogous to Example 1, 187.0 g of 4,4'-diphenylmethanediisocyanate was reacted with 47.6 g of methanol and then with 128 g of carboxyl-terminated nitrile rubber oligomer (HYCAR CTBN, M.W.=3400) to produce a blocked prepolymer. The prepolymer was reacted with 470 g of bisphenol A epoxy resin having an epoxy equivalent of 188 and then with 80.0 g of bisphenol A. The product was further reacted with 29.1 g of diethanolamine, 21.5 g of N-methylaminoethanol and 26.0 g of aminoethylethanolamine, and diluted to 80% nonvolatile with MIBK to obtain Modified resin E having a number average molecular weight of 2800 and an amine equivalent of 98 meq/100 g.

COMPARATIVE EXAMPLE 1

The same reactor as used in Example 1 was charged with 285.0 g of bisphenol A epoxy resin having an epoxy equivalent of 475, 380 g of bisphenol A epoxy resin having an epoxy equivalent of 950, 77.0 g of p-nonylphenol and 82.4 g of MIBK. After the addition of 3.0 g of dimethylbenzylamine, the mixture was allowed to react at 130° C. until an epoxy equivalent of 1140 was reached. After cooling, the product was allowed to react with a mixture of 19.2 g of diethanolamine, 27.0 g of N-methylaminoethanol and 30.6 g of aminoethylethanolamine ketimine (79% solution in MIBK) at 110° C. for two hours, and diluted to 90% nonvolatile with MIBK to obtain Modified resin F having a number average molecular weight of 2100 and an amine equivalent of 90 meq/100 g.

COMPARATIVE EXAMPLE 2

The same reactor as used in Example 1 was charged with 926.0 g of bisphenol A epoxy resin having an epoxy equivalent of 650, 213.0 g of polytetramethylene glycol as used in Example 1 and 126.7 g of MIBK. After the addtion of 2.5 g of dimethylbenzylamine, the mixture was allowed to react at 150° C. until an epoxy equivalent of 1140 was reached. After cooling, the product was reacted with a mixture of 19.2 g of diethanolamine, 27.0 g of N-methylaminoethanol and 30.6 g of aminoethylethanolamine ketimine (79% solution in MIBK) at 110° C. for two hours., and diluted to 90% nonvolatile with MIBK to obtain Modified resin G having a number average molecular weight of 3200 (GPC method) and an amine equivalent of 92 meq/100 g.

EXAMPLE 6

Pigment Paste

A three necked flask equipped with a stirrer, reflux condenser and thermometer was charged with 740 g of bisphenol A epoxy resin having an epoxy equivalent of 190 (EPIKOTE 828, Yuka Shell Epoxy K.K.), 211 g of bisphenol A, 48 g of MIBK and 1.5 g of benzyldimethylamine. The mixture was allowed to react at 170° C. for 2 hours. The resulting product having an epoxy equivalent of 700 was mixed with 244 g of thiodiethanol, 268 g of dimethylolpropionic acid and 50 g of deionized water, allowed to react at 60° C. for 5 hours and thereafter diluted to 30% solids with ethylene glycol monobutyl ether.

A pigment paste was prepared by milling the following mixture.

| Ingredients | Amount, g |
|---|---|
| Pigment dispersing resin | 200.0 (60 g solids) |
| Carbon black | 4.0 |
| Kaolin | 36.0 |
| TiO$_2$ | 150.0 |
| Basic lead silicate | 10.0 |
| Deionized water | 33.3 |

EXAMPLE 7

Crosslinker 199 parts of hexamethylenediisocyanate trime (CORONATE HX sold by Nippon Polyurethane K.K.) was diluted with 32 parts of MIBK and 0.2 parts of dibutyltin dilaurate was added thereto. To the mixture were added dropwise 87 parts of methyl ethyl ketoxime while maintaining the inner temperature at 50° C. The mixture was allowed to react at 70° C. for additional 1 hour until no absorption of isocyanate group was detected IR spectrometrically.

EXAMPLE 8

160 g as solids of the crosslinker of Example 7, 240.0 g as solids of Modified resin A and 5.0 g of dibutyltin oxide were throughly mixed. After heating to 80° C., the mixture was emulsified by slowly adding 266.6 g of deionized water containing 6.24 g of acetic acid thereto with stirring and then diluting with 445 g of deionized water to 36% solids. This emulsion was evaporated in vacuo to remove organic solvent, adjusted to 36% solids again with deionized water, mixed with 270 g (60% nonvolatile) of the pigment paste of Example 6, and finally diluted with 1400 g of deionized water and 30 g of ethylene glycol monohexyl ether to 20% nonvolatile to prepare a cathodic electrodeposition paint.

The paint was applied electrically on a zinc phosphate-treated steel plate used as cathode to a dry film thickness of 20 microns, baked at 160° C. for 20 minutes, and tested for its performance. The test results as well as the particle size of emulsion before mixing with the pigment paste measured by a spectrometer are shown in Table 1.

EXAMPLES 9–12 AND COMPARATIVE EXAMPLES 3–4

Various paints having formulations shown in Table 1 were produced as in Example 8. The ratio of cationic resin/crosslinker in the paint was 63/37 throughout Examples and Comparative Examples. The result are shown in Table 1.

TABLE 1

| | Example | | | | | Comparative Example | |
|---|---|---|---|---|---|---|---|
| | 8 | 9 | 10 | 11 | 12 | 3 | 4 |
| Modified resin | A | B | C | D | E | F | G |
| Emulsion particle size, nm[1) | 130 | 120 | 150 | 120 | 135 | 250 | 245 |

TABLE 1-continued

|  | Example | | | | | Comparative Example | |
|---|---|---|---|---|---|---|---|
|  | 8 | 9 | 10 | 11 | 12 | 3 | 4 |
| Appearance, Ra, μm[2] | 0.22 | 0.25 | 0.20 | 0.22 | 0.21 | 0.23 | 0.34 |
| Salt spray[3] | No Change | No Change | No Change | No Change | No Change | Detectable Blister | Detectable Blister |
| Impact strength at −5° C.[4] | No Change | No Change | No Change | No Change | No Change | Slight Peeling | Slight Peeling |

Footnote of Table 1
[1] Determined by Hitachi Spectrometer Model U-1100.
[2] Determined Surface Roughness Meter Model E-30A sold by Tokyo Seimitsu K.K.
[3] According to JIS-Z 2371.
[4] Ball dropping test (500 g × 50 cm) at −5° C.

We claim:

1. A method for producing a modified epoxy resin comprising the steps of:
   (a) chain extending a diglycidyl ether epoxy resin having a blocked isocyanato group at the opposed terminals thereof by
      (i) reacting a portion of the epoxy rings thereof with the blocked isocyanato groups of a difunctional prepolymer produced by the reaction of an organic diisocyanate with a compound which has a pair of active hydrogen-containing groups and which is selected from the group consisting of a polyether diol, a polyester diol, a polyoxyalkylene diamine, an alkylenediamine containing more than five carbon atoms, a long chain aliphatic dicarboxylic acid having more than five carbon atoms, a carboxyl-terminated nitrile rubber oligomer and a hydroxyl-terminated polybutadiene oligomer, and
      (ii) optionally reacting the chain-extended epoxy resin with an aliphatic monoalcohol, an alkylphenol, a glycol monoether, or a bisphenol to open a further portion only of the epoxy rings of the chain-extended epoxy resin; and
   (b) reacting the thus-produced chain-extended epoxy resin with a cationic active hydrogen compound to open the remaining epoxy rings thereof.

2. The method according to claim 1, wherein said bifunctional active hydrogen compound is a polyether diol, a polyester diol, a polyoxyalkylene diamine, a carboxyl-terminated nitrile rubber oligomer, or a hydroxyl-terminated polybutadiene oligomer.

3. The method according to claim 1, wherein said organic diisocyanate is an aromatic diisocyanate.

4. The method according to claim 1, wherein said prepolymer is blocked with methanol or ethanol.

5. The method according to claim 1, wherein said diglycidyl ether epoxy resin is a bisphenol epoxy resin having an epoxy equivalent from 150 to 2000.

6. The method according to claim 1, wherein said cationic active hydrogen compound is a primary or secondary amine, a tertiary amine-acid addition salt, or a sulfide-acid mixture.

7. A modified epoxy resin produced by the method of claim 1.

8. A water-borne paint comprising the modified epoxy resin of claim 7 dispersed in an aqueous medium containing a crosslinker and a neutralizing agent.

9. The water-borne paint as claimed in claim 8, wherein said crosslinker is a blocked polyisocyanate.

10. The water-borne paint as claimed in claim 8, wherein said crosslinker is a melamine resin.

11. The method according to claim 1, wherein the epoxy groups of the chain-extended epoxy resin are closed and intact; wherein said bifunctional active hydrogen compound is a polyether diol, a polyester diol, a polyoxyalkylene diamine, a carboxyl-terminated nitrile rubber oligomer, or a hydroxyl-terminated polybutadiene oligomer; wherein said organic diisocyanate is an aromatic diisocyanate; wherein said prepolymer is blocked with methanol or ethanol; wherein said diglycidyl ether epoxy resin is a bisphenol epoxy resin having an epoxy equivalent from 150 to 2000; and wherein said cationic active hydrogen compound is a primary or secondary amine, a tertiary amine-acid addition salt, or a sulfide-acid mixture.

12. The method according to claim 1, wherein said bifunctional active compound is a polyether diol.

13. The method according to claim 11, wherein said bifunctional active compound is a polyether diol.

14. A modified epoxy resin produced by the method of claim 12.

15. A modified epoxy resin produced by the method of claim 13.

16. A method according to claim 1 which includes the optional step of reacting the chain extended diglycidyl ether epoxy resin produced by the reaction of the prepolymer with an organic diisocyanate with the compound having a pair of active hydrogen-containing groups; and wherein said organic diisocyanate is an aromatic diisocyanate; wherein said prepolymer is blocked with methanol or ethanol; wherein said diglycidyl ether epoxy resin is a bisphenol epoxy resin having an epoxy equivalent from 150 to 2000; and wherein said cationic active hydrogen compound is a primary or secondary amine, a tertiary amine-acid addition salt, or a sulfide-acid mixture.

17. The method according to claim 11, which comprises the further step of dispersing the thus-produced modified epoxy resin in an aqueous medium containing a crosslinker and a neutralizing agent.

18. The method according to claim 1, which comprises the further step of dispersing the thus-produced modified epoxy resin in an aqueous medium containing a crosslinker and a neutralizing agent.

19. The method according to claim 18, wherein the crosslinker is an etherified methylolmelamine resin or a blocked polyisocyanate.

20. The method according to claim 18, wherein said neutralizing agent is hydrochloric acid, nitric acid, phosphoric acid, formic acid, acetic acid, lactic acid, sulfamic acid or acetylglycine.

* * * * *

UNITED STATES PATENT AND TRADEMARK OFFICE
CERTIFICATE OF CORRECTION

PATENT NO. : 5,447,973
DATED : September 5, 1995
INVENTOR(S) : Yamada et al.

It is certified that error appears in the above-indentified patent and that said Letters Patent is hereby corrected as shown below:

Column 9:
  Claim 1, line 4: Delete in its entirety.
          line 5: Delete "terminals thereof".

Signed and Sealed this

Twenty-sixth Day of December, 1995

Attest:

BRUCE LEHMAN

*Attesting Officer*      *Commissioner of Patents and Trademarks*